United States Patent [19]

Fuller et al.

[11] 4,219,208
[45] Aug. 26, 1980

[54] STEERABLE WHEELED ASSEMBLY

[75] Inventors: Niles H. Fuller, Idaho Falls; Melvin G. Grover, Rigby, both of Id.

[73] Assignee: Logan Farm Equipment Co., Inc., Idaho Falls, Id.

[21] Appl. No.: 878,360

[22] Filed: Feb. 16, 1978

[51] Int. Cl.² .......................... B62D 7/08; B62D 13/00
[52] U.S. Cl. ................................... 280/95 R; 116/31; 172/289; 180/154; 280/419; 280/445; 280/96.1; 280/DIG. 9; 280/DIG.14
[58] Field of Search ............. 280/771, 89, 95 R, 96.1, 280/419, 445, DIG. 9, DIG. 14; 180/154; 172/289; 116/31, 28 R

[56] References Cited

U.S. PATENT DOCUMENTS

| | | | |
|---|---|---|---|
| 1,166,680 | 1/1916 | Hanson | 116/31 |
| 1,217,105 | 2/1917 | Rodd | 116/31 |
| 1,248,231 | 11/1917 | Willis | 172/289 |
| 1,290,648 | 1/1919 | Page | 116/31 |
| 1,810,783 | 6/1931 | Noble | 172/289 X |
| 2,369,324 | 2/1945 | Thompson | 180/154 |
| 2,433,422 | 12/1947 | Briscoe | 172/289 |
| 2,612,385 | 9/1952 | Piltz | 280/95 R X |
| 2,788,858 | 4/1957 | Aasland | 280/95 R X |
| 3,527,316 | 9/1970 | Jones | 280/95 R |
| 4,033,426 | 7/1977 | Williams | 280/419 X |

*Primary Examiner*—John P. Silverstrim
*Attorney, Agent, or Firm*—Arthur H. Swanson

[57] ABSTRACT

A steerable wheeled assembly for a vehicle such as a harvesting or windrowing machine of the type adapted to be drawn over crop rows in the ground is disclosed. The assembly includes rotatable vertical members and a horizontal axle member which are arranged in a "C" frame supportingly connected to the vehicle and which provides clearance under the axle. Ground engaging wheels rotate on stub axles which pivot in steering movement when the vertical members are rotated. Steering or pivot arms are mounted on each of the vertical members and are connected together by a tie rod. A fluid power actuated cylinder connected to one of the arms is used to pivot the arm and stear the vehicle.

14 Claims, 6 Drawing Figures

STEERABLE WHEELED ASSEMBLY

BACKGROUND OF THE INVENTION

1. Field of the Invention

This invention relates generally to steerable, ground engaging wheeled assemblies for vehicles, and more particularly to steerable axle wheeled assemblies for drawn or trailed vehicles which are provided with wheel turn angle and direction indicator means and which are affixed to the vehicles in supporting relation; ample clearance between the axle and crop rows in the ground over which it is drawn being provided.

2. Description of the Prior Art

Various forms of wheeled assemblies with both steerable and non-steerable axles have been proposed and used in the prior art. In addition, some prior art steerable axle wheeled assemblies have been equipped with turn angle indicators. An example of a steerable wheel assembly for an automobile with turn angle indicator is disclosed in U.s. Pat. No. 1,166,680, issued Jan. 4, 1916, in which a turn indicator has a pointer in the form of an arrow fixedly mounted at the upper end of an upstanding rotary shaft which is pivotally attached via a rearwardly projecting crank arm connected to one end of a link. The link, at its opposite end, is pivoted to the steering rod of the front wheels of the automobile. When the steering wheel of the automobile is turned by the driver, the front wheels also turn, in parallel, and the pointer arrow pivots correspondingly to give an indication of the direction in which the wheels are headed. Such front wheel turn indicators have been found useful in automobiles in the past to provide the driver with information concerning the position of his front wheels. Such devices have the disadvantage however, of at least partially obstructing the driver's view in front resulting in an unsafe or hazardous driving condition. In addition, in automobiles, such appurtenances are, by present day standards of design, rather unsightly and aesthetically undesirable.

U.S. Pat. No. 3,103,909, issued on Sept. 17, 1968 discloses a turn indicator also intended for automobiles to indicate the turn angle or position of the front wheels when turning. This indicator operates through associated split gears on shafts and bearings when the steering wheel is turned on its shaft through the steering gear box of the automobile. The indicator also includes a pointer and gauge dial to provide information relative to turning angle and left or right direction of the front wheels. Such an arrangement has the disadvantage, however, of being unduly complex and mechanically complicated and impractical. In addition, such a device can provide front wheel turning angle information only because of its attachment to and dependence on the automobile's steering gear system. While overcoming the disadvantage of poor aesthetics which attended the previously described patented device, this device is too costly because of its relative complexity and mechanical impracticability to have application to implements and vehicles of the type with which the present invention is concerned.

U.S. Pat. No. 3,463,507, issued Aug. 26, 1969 discloses a dirigible wheeled assembly for a trailing or drawn vehicle in which a steering linkage is attached to a pair of wheels mounted for steering movement about their respective vertical axes. The assembly supports an agricultural implement such as a trailing plow and features a telescoping linkage or steering arm which permits the wheels to turn sharply without undue scuffing or dragging during the turn. However, this machine has the disadvantage that no means is provided whereby observation from the tractor will provide information as to the position of the trailing vehicle with respect to the crop rows in the terrain over which the vehicle is being drawn nor information as to the turn angle and direction of the wheels of the wheeled assembly with respect to the vehicle. Information of this sort is ordinarily very useful, desirable and important to an operator using these machines and implements. However, when operating them on hilly or contoured terrain without some means to tell the direction and turning angle or attitude of the wheels, it is almost impossible to keep the vehicle trailing along the intended course in the crop row.

Other prior art patents are known which disclose high clearance dirigible axles for wheeled assemblies, for example, U.S. Pat. No. 2,507,000, issued May 9, 1950. This patent discloses a front axle having a horizontal member and a pair of vertical members which are arranged to pivot about their long axes, when actuated through associated linkage members by action of an attached steering gear mechanism. The wheels are arranged on stub axles at the bottom of the vertical members and pivot therewith in a steering movement. Such an assembly is useful on a tractor which is moved over the ground in crop rows in planting fields and provides ample ground clearance above the ground. Such devices however, have the disadvantage that there is no indicator means to inform the operator of the direction or turning angle of the wheels during operation. Unless the assembly is used on a tractor, the wheels of which are visible to the operator, the latter has no way of knowing or determining the angular position of the front wheels when turning or when standing before the vehicle is put in motion.

In addition, since the wheeled assembly disclosed in this patent is intended for use as the front wheel assembly of a tractor, this patent does not address itself to the problem faced by the operator of a tractor which is drawing or trailing a wheeled vehicle in crop rows in the ground behind it, namely of obtaining, by observation, information as to the position of the trailing vehicle wheels with respect to the crop rows and/or other information as to the turn angle and direction of the wheels of the wheeled assembly with respect to the vehicle.

Another problem which attends wheeled assemblies of the prior art, both steerable and non-steerable, particularly when used with agricultural implements such as root plant crop harvesting machines, e.g., potato, onion and/or beet harvesting machines, windrowers and the like equipment used either in conjunction therewith, or independently thereof, concerns the location of the wheeled assembly axles. In the prior art, these axles are conventionally positioned and located on the trailing vehicle so as to pass transversely under or between the digger chains and conveyor belts and the like of the harvesting or windrowing machine vehicle and, as a result, an undesirable accumulation of dirt, debris and other materials such as plant vines and the like, occurs which means the machine must be stopped to clear away the offending material, thereby interfering with harvesting operations.

SUMMARY OF THE INVENTION

Among the objects of the present invention is the provision of a wheeled assembly for a vehicle adapted to be drawn or trailed over the ground which is steerable and includes an indicator system for indicating the turning angle and direction of the wheels of the assembly.

Another object of the present invention is to provide a wheeled assembly of the character described in which the steerable axle is located on the vehicle where the accumulation of dirt and other debris and like material under the vehicle is substantially obviated.

A further object of the present invention is to provide a steerable axle for a ground engaging wheeled assembly of the character described which has a generally "C" shaped frame having horizontal and vertical members on which the vehicle is supported and on which the wheels are pivotally and rotatably carried for steering and rolling movement respectively, the former by means of associated linkage and an actuator device which operates a pivot arm on the vertical members and the latter by means of a spindle assembly including axles on which the wheels rotate, said assembly further including an indicator system for providing information relevant to the steering angle and direction of the wheels.

Still another object of the present invention is to provide a ground engaging, steerable wheeled assembly for a vehicle of the character described in which the turn angle indicator system is located substantially centrally of the vehicle whereby observation thereof provides information as to the position of the vehicle with respect to crop rows in the ground over which the vehicle is drawn and the turn angle and direction of the wheels of the wheeled vehicle with respect to the ground.

A still further object of the present invention is to provide a ground engaging, steerable wheeled assembly for a vehicle of the character described which, in addition to having a "C"-shaped frame which makes for a relatively high clearance overhead axle, an operator observable, severally constructed turn angle indicator system means and an actuating pivoting device also includes extendible and rigidifiable locking means for fixing the angle and direction of the wheels at a selected, angular position or in a straight ahead, aligned position.

In accomplishing these and other objects there is provided according to the present invention a dirigible axle for a ground engaging wheeled assembly supportingly connected to a vehicle adapted to be drawn or trailed over the ground, which axle comprises a horizontal member preferably connected in the form of a "C" frame to rotatable spaced apart, generally vertical members having spindle assemblies including ground engaging wheels which rotate on the ground and pivot in a steering movement when the vertical members are rotated. The vertical members have pivot arms which are inter-connected through a steering link or tie rod. A power actuator in the form of a fluid power cylinder is mounted on the vehicle and connected to one of the pivot arms so that when actuated, the arms and the vertical members are made to pivot in unison about their long axes and steering motion is imparted to the wheels. A turn indicator preferably comprising a pointer and a gauge dial of severally componented construction is arranged on the vehicle substantially centrally thereof and positioned so that when observed it provides information as to the position of the drawn or driven trailing vehicle with respect to crop rows in the ground over which it is being drawn, as well as information about the turn angle and direction of the wheels of the wheeled assembly relative to the vehicle. In the above preferred embodiment the "C" frame construction advantageously allows the axle to be located, and the vehicle positioned, where the accumulation of dirt, plant crop material such as vines and the like, or other debris, is substantially eliminated because of the relatively high ground clearance provided. Prior to the present invention, these machines, particularly harvesting, windrowing and like machines and equipment, conventionally used standard axles which are located under, or between the digger chains and/or blet conveyor devices carried thereon reducing the ground clearance and causing clogging with dirt, vines and other debris which accumulates under and around the axle. Harvesting operations being thus interferred with, must be discontinued at least temporarily, to clean out the offending matter from beneath and around the axle.

In the preferred embodiment of the invention, the indicator gauge dial is stationary being fixed to or otherwise mounted on the vehicle, preferably on the horizontal member and the pointer is relatively movable being carried by while attached to the linkage or tie rod. In another form of the invention the tie rod carries the gauge dial while the pointer is stationary being fixed to the vehicle.

DESCRIPTION OF THE PREFERRED EMBODIMENT

Figure 1:
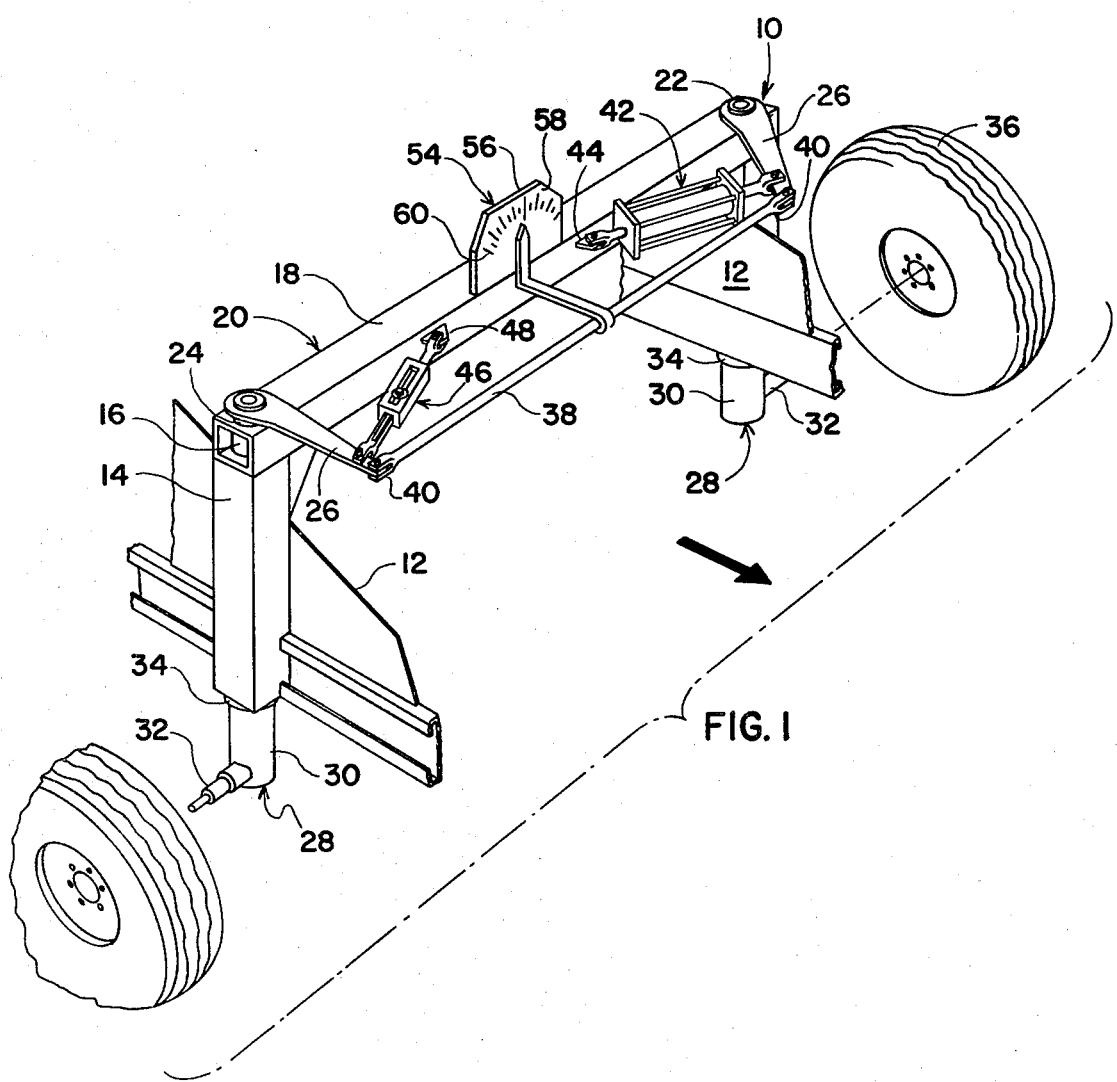
FIG. 1 is an exploded, perspective view of a preferred steerable wheeled assembly with a severally componented turn indicator system included, some parts broken away and other, non-essential parts omitted.
Figure 2:
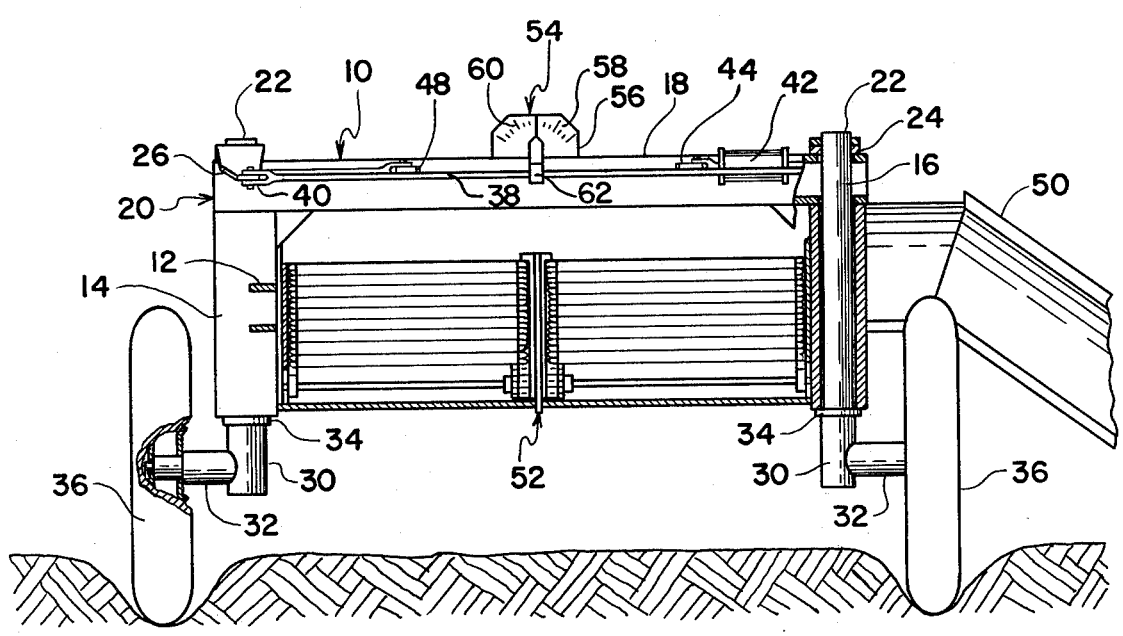
FIG. 2 is a front elevational, partially sectioned view of the invention used as a steerable wheeled supporting assembly for a windrower vehicle being drawn or trailed in crop rows over the ground, some parts omitted.

A preferred form of steerable wheeled assembly in accordance with the present invention is depicted in the drawings. With particular reference to FIGS. 1 and 2, a wheeled assembly 10 is shown together with a portion of the frame of a driven or drawn trailing vehicle 12 to which it is supportingly attached, as by welding, to the lower ends of the vertical housings 14 of a pair of spaced apart, rotatable members 16. A horizontal axle member 18 is positioned on and lies across the tops of housings 14 being attached thereto, as by welding, forming a "C" frame structure 20.

Vertical members 16 extend upwardly in housings 14 and are coupled to member 18 with their top ends 22 protruding from member 18 and extending above it a short distance. Each top end 22 carries a bushing 24, as shown in FIG. 2, pivotally supporting a steering or pivot arm 26. Arms 26 are pivotally connected to vertical members 16 on ends 22 being so mounted thereon so that when pivoted in a cranking movement members 16 rotate about their respective long, or vertical axes.

The lower ends of vertical members 16 extend below "C" frame 20 from housings 14 and terminate in the pivotable spindle assemblies 28. Each spindle assembly 28 comprises a short, downwardly extending tube end piece 30, a laterally extending stub axle 32 and a bushing or thrust washer 34 positioned on tube piece 30 between the top thereof and the bottom of housing 14. It has been found that the latter may be dispensed with, however its use is generally desirable since it provides a wear plate for these surfaces. A ground engaging wheel 36 is rotatably secured on each stub axle 32 and, as will be appreciated from FIGS. 1 and 2, when arms 26 pivot to rotate vertical members 16, wheels 36 also pivot in a steering movement therewith.

A steering linkage or tie rod 38 is flexibly attached at its opposite ends to the outer ends of each pivot arm 26 by suitable connectors, for example, the pin connected clevises 40 on the ends of tie rod 38.

Each arm 26 has a pair of pre-formed or pre-drilled holes, one outboard and one inboard, the former for receiving the clevis pin of clevises 40 to connect the ends of tie rod 38 and the latter for attaching the rod end of a pivot driver or actuating device, for example, the double acting fluid powered cylinder 42, it being understood that the particular type of actuating device selected for use is not critical since other devices well-known to the skilled artisan may also be used.

Referring again to FIG. 1, actuator 42 is mounted on vehicle 12 toward the right side thereof, one end being pin connected to a right-hand mounting bracket or fitting 44 on the vertical side of axle member 18, the other, or piston rod end being pin connected in the inboard drilled hole in the right-hand arm 26. On the opposite side, corresponding left-hand pivot arm 26, also has outboard and inboard pre-drilled holes, the former for pin connecting the left-hand clevis 40 of tie rod 38 and the latter for connecting one end of an extendible, rigidifiable locking device 46. The other end of extendible device 46 is flexibly pivoted to a second, or left-hand bracket or fitting 48 on axle member 18.

To provide an operator of a tractor which may be used to drive or draw trailing vehicle 12, which vehicle may be a harvesting machine, particularly a harvesting machine having a digging mechanism including a digger chain 52 driving a conveyor belt or the like, which is diagrammatically depicted in FIG. 2, for digging up and harvesting certain types of tuber-propagated plants or crops such as potatoes, beets and onions, or a pre-harvesting machine such as the windrowing apparatus 50 also illustrated in FIG. 2, with information concerning the position of vehicle 12 relative to the crop rows in the ground together with additional information as to the turning angle and the direction of wheels 36 of assembly 10, a severally componented indicator system 54 is provided which is shown located substantially centrally of vehicle 12 for easy observation by the operator.

In the preferred embodiment of the invention, indicator system 54 comprises a stationary gauge dial 56 fixedly mounted on axle member 18, the dial face 58 of which has a printed scale of angular graduations 60 which are calibrated uniformly from a central, or zero point so that corresponding angles may be indicated to the right or left thereof accordingly as the wheels are turned to the right or left, and a pointer 62 fixedly mounted on and carried by tie rod 38.

Figure 6:
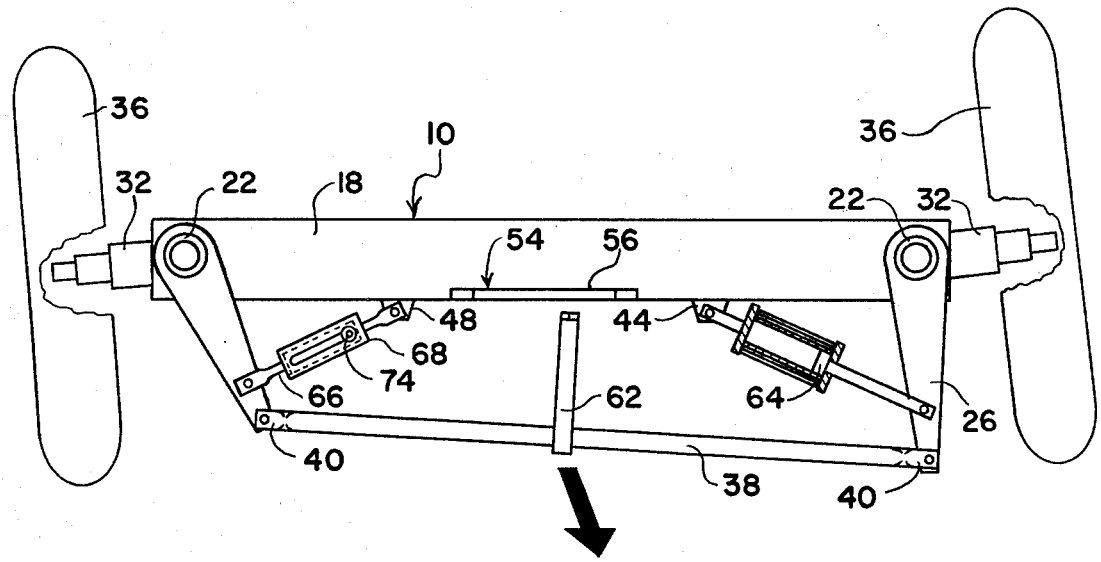

In operation with reference to FIG. 6, when wheels 36 on axles 32 are turned, or steered to the right by the operator in the tractor, (not shown) as indicated by the arrow, fluid pressure supplied from a fluid pressure supply (not shown) to the top, or front side of the piston 64 of pivot actuator 42, causes arms 26 to pivot in unison owing to the connection thereto of tie rod 38. Tie rod 38 moves to the right carrying pointer 62 with it. Pointer 62 moving with the rod 38, takes up a new position in front of scale 60 on dial face 58 of stationary gauge dial 56, which when observed by the operator in the tractor povides him with information as to the position of the vehicle with respect to the crop rows in which the vehicle is being drawn, as shown in FIG. 2, and also tells him the angular position and direction of wheels 36 of assembly 10.

Figure 4:
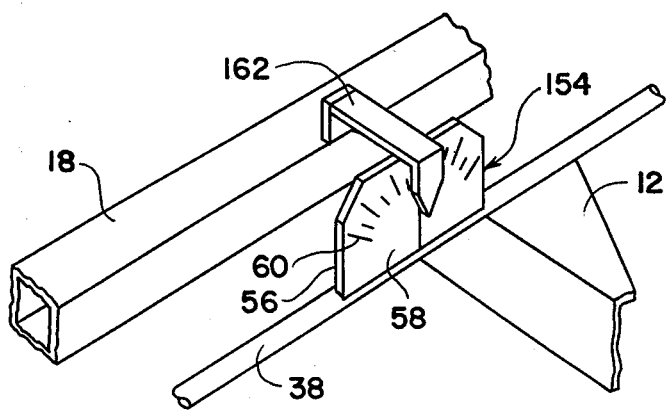
FIG. 4 is a fragmentary, perspective view of a severally componented turning angle indicator system used in another embodiment of the invention.

To describe the invention in a slightly modified form, reference will be made to FIG. 4 in which a different indicator system 154 is depicted. In this instance gauge dial 56 of the previous embodiment is mounted on linkage or tie rod 38 for movement therewith and a modified pointer 162 is mounted on axle member 36 being stationary thereon and shaped or formed as shown in FIG. 4 with its pointer end suspended above and in front of graduated scale 60 on dial face 58 of gauge dial 56.

Figure 5:
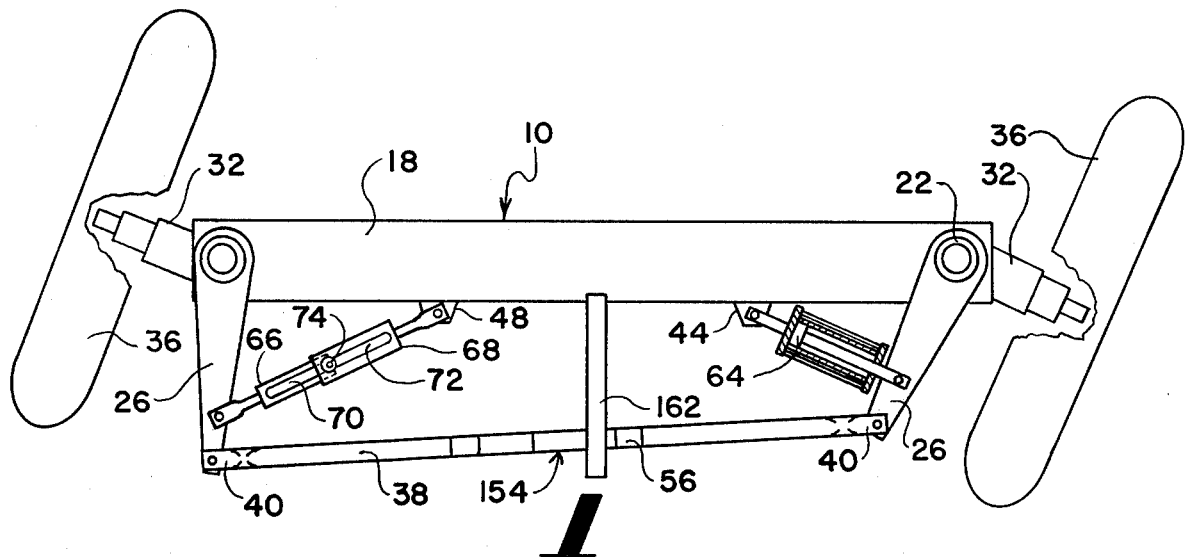
FIG. 5 is a generally diagrammatic plan view of the wheeled assembly according to FIG. 3, the wheels in this instance pivoted in a steering movement to a new position to the left, being drawn in the direction of the arrow, and the turning indicator system being the system shown in FIG. 4; and, FIG. 6 is a generally diagrammatic plan view of the wheeled assembly according to FIG. 3, the wheels pivoted in a steering movement to still another position to the right being drawn in the direction of the arrow, and the turning indicator system being the system shown in FIGS. 1, 2 and 3.

In operation of this embodiment, when wheels 36 are turned in steering movement, say, to the left, as indicated by the arrow in FIG. 5, by fluid pressure supplied from a supply (not shown) to the bottom or backside of piston 64, arms 26 pivot to the left in unison by connection thereto of tie rod 38 which also moves to the left carrying gauge dial 56 to a new position under stationary pointer 162. As in the previously described instance, observation of indicator system 154 provides the operator in the tractor (not shown) with complete information as to the position of vehicle 12 as it trails behind the tractor relative to the crop rows and also as to angle of turn and direction of wheels 36 of wheeled assembly 10 relative to vehicle 12.

Figure 3:
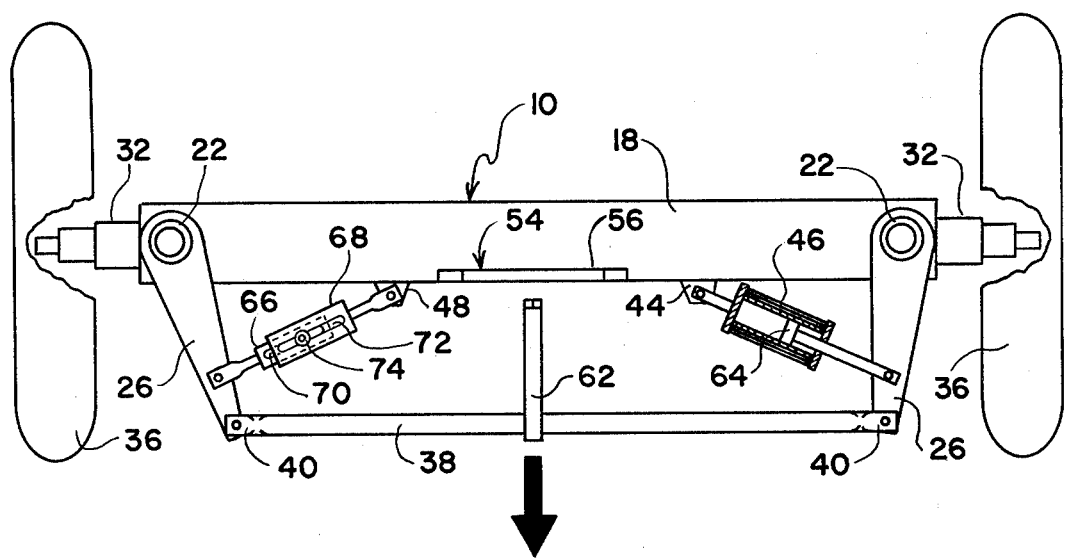
FIG. 3 is a generally diagrammatic plan view, some parts omitted, of the wheeled assembly of the invention, the wheels thereof having been pivoted in a steering movement to a straight ahead or aligned position, being drawn in the direction of the arrow.

Referring now to FIGS. 1 and 3, extendible and rigidifiable locking device 46 will be described. Locking device 46 comprises a pair of longitudinally slotted members 66 and 68, the former being dimensionally, sufficiently small to slide in the latter in telescoping relation. The opposite end of member 66 is pin connected to left-hand pivot arm 26 in its inboard, pre-drilled hole and the opposite end of member 68 is pin connected to left-hand bracket 48 on axle member 18. A longitudinal slot 70 is formed on member 66 which lies adjacent a corresponding slot 72 in member 68 when these members are assembled and a clamping device 74 in the form of a bolt with associated washers and a nut is used to hold members 66 and 68 together.

In operation, tightening of the nut on the bolt of clamp 74 clamps these members and rigidifies locking device 46 in a locking action. Loosening of the nut and bolt of clamp 74 unlocks device 46 permitting member 66 to extend or contract into and out of member 68. It will be appreciated, therefore, by this means wheels 36 and assembly 10 can be locked in any selected angular position, the extent of which is limited by the lengths of slots 70 and 72, or in a straight ahead position as is illustrated in FIG. 3.

In addition to being fully steerable, wheeled assembly 10 of the present invention as described previously being arranged with its main members into a "C" frame structure 20 a high clearance, overhead axle which, particularly when used on digging machines, particularly potato and like crop has the advantage of its axle being located where it cannot accumulate dirt, vines, plant material and other debris, thereby avoiding the congestion caused by conventional axles. In addition, the overhead axle "C" frame 20 can be locked in place or used as a steerable axle.

What is claimed is:

1. A ground engaging wheeled assembly for a drawn or trailed vehicle comprising:
    steerable axle means including a horizontal member and a pair of spaced vertical housings jointed to said horizontal member forming a "C" frame, said vehicle supportingly connected to said "C" frame, a rotatable vertical member in each of said housings having an upper end extending from said housing and pivotally connected to said "C" frame and a lower end extending from said housing including spindle means on which a ground engaging wheel is rotatably supported and adapted to pivot when said vertical members are rotated;
    a pivot arm fixed to each upper end of said vertical members for rotating said members when said arms are pivoted;
    a tie rod pivotally connecting said arms and positioned between them whereby pivoting of one of said arms effects a corresponding pivoting of the other of said arms;
    pivoting means carried by said vehicle operatively associated with one of said arms for pivoting said arm and steering said wheeled assembly;
    turn indication means located on the vehicle operatively associated with said axle means for indicating the turning angle and steering direction of the wheels of said assembly; and
    pivot arm locking means for fixing the turn angle of said wheels of said assembly in a preselected position, said locking means being a rigidifiable extendible member connecting one of said arms to said horizontal member.

2. The wheeled assembly as specified in claim 1 in which said extendible member comprises at least two slidable links arranged in longitudinal, side by side relation having mutually adjacent, longitudinal slots and including clamping means in said slots for clamping said links together and rigidifying said member.

3. The wheeled assembly as specified in claim 1 in which said extendible member comprises a pair of telescoping links having mutually adjacent, longitudinal slots and clamping means in said slots for clamping said links and rigidifying said extendible member.

4. The wheeled assembly as specified in claim 1 in which the turn indication means is severally componented including a component disposed on said axle means adapted to move in turn angle and steering direction indicating relation when said tie rod effects said corresponding pivoting of said other arm and at least one additional component which remains stationary relative to said first component, and in which said component disposed on said axle means is carried by said tie rod.

5. The wheeled assembly as specified in claim 4 in which said component carried by said tie rod is a pointer.

6. The wheeled assembly as specified in claim 4 in which said component carried by said tie rod is a gauge dial.

7. The wheeled assembly as specified in claim 1 in which the turn indication means is severally componented including a component disposed on said axle means adapted to move in turn angle and steering direction indicating relation when said tie rod effects said corresponding pivoting of said other arm and at least one additional component which remains stationary relative to said first component, and in which said component disposed on said axle means is carried by said tie rod and said additional component is fixed to said horizontal member.

8. The wheeled assembly as specified in claim 7 in which said components are a pointer and a gauge dial respectively.

9. The wheeled assembly as specified in claim 7 in which said components are a gauge dial and a pointer respectively.

10. Steerable axle means for a ground engaging wheeled assembly of a trailed or drawn vehicle having a frame supported on said assembly comprising:
    a horizontal member supported on said frame in vertically spaced, laterally extending overhead relation to said vehicle;
    a pair of spaced apart, generally vertical rotatable members having upper ends coupled to said horizontal member and lower ends including pivotal means for rotatably supporting and pivoting the wheels of said assembly;
    steering means on said vertical members for rotating said members and pivoting said wheels;
    linkage means between said vertical members pivotally connected to said steering means;
    actuating means on said vehicle operably connected to said steering means for rotating said vertical members and steering said axle means; and
    severally componented visible indication means disposed on said vehicle for providing information respecting the turn angle and position of said wheels relative to said vehicle including a component which, in normal use providing said information, is relatively stationary and at least one additional component which, in normal use providing said information, is relatively movable with respect to said stationary component, said relatively stationary component being fixed to said horizontal member and comprising a gauge dial, the additional component being a pointer carried by said linkage means.

11. Steerable axle means for a ground engaging wheeled assembly of a trailed or drawn vehicle having a frame supported on said assembly comprising:

a horizontal member supported on said frame in vertically spaced, laterally extending overhead relation to said vehicle;

a pair of spaced apart, generally vertical rotatable members having upper ends coupled to said horizontal member and lower ends including pivotal means for rotatably supporting and pivoting the wheels of said assembly;

steering means on said vertical members for rotating said members and pivoting said wheels;

linkage means berween said vertical members pivotally connected to said steering means;

actuating means on said vehicle operably connected to said steering means for rotating said vertical members and steering said axle means; and severally componented visible indication means disposed on said vehicle for providing information respecting the turn angle and position of said wheels relative to said vehicle including a component which, in normal use providing said information, is relatively stationary and at least one additional component which, in normal use providing said information, is relatively movable with respect to said stationary component, said relatively stationary component being fixed to said horizontal member and comprising a pointer, the additional component being a gauge dial carried by said linkage means.

12. Steerable axle means for a ground engaging wheeled assembly of a trailed or drawn vehicle having a frame supported on said assembly comprising:

a horizontal member supported on said frame in vertically spaced, laterally extending overhead relation to said vehicle;

a pair of spaced apart, generally vertical rotatable members having upper ends coupled to said horizontal member and lower ends including pivotal means for rotatably supporting and pivoting the wheels of said assembly;

steering means on said vertical members for rotating said members and pivoting said wheels;

linkage means between said vertical members pivotally connected to said steering means;

actuating means on said vehicle operably connected to said steering means for rotating said vertical members and steering said axle means;

severally componented visible indication means disposed on said vehicle for providing information respecting the turn angle and position of said wheels relative to said vehicle including a component which, in normal use providing said information, is relatively stationary and at least one additional component which, in normal use providing said information, is relatively movable with respect to said stationary component; and locking means for said steering means for fixing the turn angle of said wheels of said wheel assembly in a preselected position, said locking means being a rigidifiable, extendible member connected between said arm and each of said steering means and said horizontal member.

13. Steerable axle means as specified in claim 12 in which said extendible member comprises at least two sliding links arranged in longitudinal, side by side relation having mutually adjacent longitudinal slots and including clamping means in said slots for clamping said links together and rigidifying said member.

14. Steerable axle means as specified in claim 12 in which said extendible member comprises a pair of telescoping links having mutually adjacent longitudinal slots and clamping means in said slots for clamping said links and rigidifying said extendible member.

* * * * *